United States Patent
Whitley et al.

(10) Patent No.: US 7,225,145 B2
(45) Date of Patent: May 29, 2007

(54) METHOD AND SYSTEM FOR PROVIDING MULTI-ORGANIZATION RESOURCE MANAGEMENT

(75) Inventors: Kevin Whitley, Palo Alto, CA (US); Jim Rhee, Saratoga, CA (US); Norman Adams, Palo Alto, CA (US)

(73) Assignee: Ariba, Inc., Sunnyvale, CA (US)

(*) Notice: Subject to any disclaimer, the term of this patent is extended or adjusted under 35 U.S.C. 154(b) by 1030 days.

(21) Appl. No.: 09/866,107

(22) Filed: May 25, 2001

(65) Prior Publication Data
US 2002/0035514 A1 Mar. 21, 2002

Related U.S. Application Data

(60) Provisional application No. 60/207,314, filed on May 26, 2000.

(51) Int. Cl.
*G06Q 30/00* (2006.01)
(52) U.S. Cl. .................................................. 705/26
(58) Field of Classification Search ............... 705/26, 705/27; 709/227, 246
See application file for complete search history.

(56) References Cited

U.S. PATENT DOCUMENTS

| | | | |
|---|---|---|---|
| 5,319,542 A | 6/1994 | King, Jr. et al. | |
| 5,758,327 A | 5/1998 | Gardner et al. | |
| 5,970,475 A | 10/1999 | Barnes et al. | |
| 6,243,752 B1* | 6/2001 | Butt | 709/227 |
| 6,256,676 B1* | 7/2001 | Taylor et al. | 709/246 |

FOREIGN PATENT DOCUMENTS

| WO | WO 98/49644 | 11/1998 |
|---|---|---|
| WO | WO 00/58948 | 10/2000 |

OTHER PUBLICATIONS

SAP Australia and New Zealand [SAPIENT College] R/3 Release 3.0 Training (Improving Business Results Through Training http://www.sap.com/australia/sapient/customer/53/5307/desc.htm 7 pages.

Microsoft Press Pass Microsoft Announces Implementation of SAP's Human Resources Solution http://www.microsoft.com/corpinfo/press/1997/May 97/SAPHRpr.htm 2 pages.

SAP AG [Press Information Center] "SAP and Aspect Team Up to Reduce Manufacturers' Procurement Costs and Time to Market" http://www.sap.com/press/de_02_97.htm Press Release Feb. 8 pages.

(Continued)

*Primary Examiner*—Jaime Zurita
(74) *Attorney, Agent, or Firm*—Van Pelt, Yi & James LLP

(57) ABSTRACT

A method and system for providing multi-organization resource management. According to one embodiment of the invention, data is imported from a set of one or more external applications, a purchase requisition is generated from resource data from the set of one or more external applications. Then, after the purchase requisition is approved and validated the purchase requisition is converted to a purchase order and exported to one or more external applications.

16 Claims, 4 Drawing Sheets

OTHER PUBLICATIONS

SAP AG [SAP Business Information Warehouse Information Center] "SAP Business Information Warehouse-Functionality" http://www.sap.com/products/biw/biw_func.htm 2 pages.

SAP Business Information Warehouse Technology copyright 1997 SAP AG. All rights reserved, 22 pages.

SAP "Direct Link Integrated Web-based Catalog and Purchase Requisition System" Development & Technology, 2 pages.

Written by Technology Marketing, SAP AG "R/3™ System Benefits of the Business Framework" Copyright 1997 SAP AG. All rights reserved. 12 pages.

Nelson Matthew "Commerce One Inks Integration Deals with SAP, Microsoft" Info World Electric (Info Whttp://www.infoworld.com/cgi-bin/displayShow.pl?971210.icommerce1.htm Mar. 23, 1998, 2 pages.

Fisher Technology Group "ComerStone, A "Net" Solution for Both Buying and Selling Organizations" http://www.ftechg.com/stone.html, 7 pages.

ProcureNet http://www.procurenet.com/features.htm 2 pages.

http://www.ftechg.com/product.html "Products and Services" Web Commerce Solutions Copyright 1997 Fisher Technology Group, 2 pages.

http://www.commerceone.com/products/sub).htm "The C-1 Commerce Chain" Commerce One: Products, 8 pages.

IBM Fisher Technology Group (to Market Commerce Solutions) "Network Computing" http://www.internet.ibm.com/new/2a/2.html Sep. 9, 1997, 3 pages.

Andrews, Whit "E-Commerce Firm Bets On Software for Buying, Not Selling" http://www.internetworld.com/print.../11/17/industry/19971117-firm.html, Nov. 17, 1997, 3 pages.

Strohecker, James & Berkowitz, Todd Connect Introduces Purchasestream: Internet-Based Application Software To Streamline Corporate Purchasing. http://www.connectinc.com/whatsnew/pstream.htm, 5 pages.

http://www.connectinc.com/products/QS_catalogmgmt.html Quickstart fro OrderStream Catalog Management, 1 page.

Berst, Jesse "Business-to-Business E-Commerce Poised for Growth" Jesse Berst's Anchor Des, your source of tech intelligence. http://www.zdnet.com.au/anchordesk/story/story_1003.html. Jun. 16, 1997. 2 pages.

SAP "Business Information Warehouse A ready-to-go data warehouse for R/3, complete with integrated business know-how" Copyright 1997 SAP AG. All rights reserved. 12 pages.

* cited by examiner

METHOD AND SYSTEM FOR PROVIDING MULTI-ORGANIZATION RESOURCE MANAGEMENT

CROSS-REFERENCE TO RELATED APPLICATIONS

This application claims the benefit of U.S. Provisional Application No. 60/207,314, filed May 26, 2000.

BACKGROUND OF THE INVENTION

1. Field of the Invention

The invention relates to the field of enterprise resource planning. More specifically, the invention relates to the ability to access multiple external applications simultaneously.

2 Background of the Invention

Enterprise Resource Planning (ERP) is an industry standard term to describe the multitude of accounting oriented applications that aid in the planning and support of business process data. For many businesses ERP applications include complex information systems that support and automate business processes such as human resources, manufacturing, distribution, project management, payroll, financials, etc. Building and maintaining the interrelationships between the applications making up a ERP system is a daunting task because each application may have its own set of attributes and business rules. In addition, these applications are developed by various software vendors (e.g. SAP, PeopleSoft, Oracle, etc) that may obtain and store the data from a variety of sources (e.g. flat files, relationship databases, etc.).

In an effort to relieve some of the complexity, enterprise applications have been created that provide access to many ERP applications from a single application. For example, buying organizations may use an enterprise application to enable their corporate community of users, approvers and related departments to acquire all of their operating resources via a single, common networked infrastructure. The enterprise application channels the users to products and services from preferred suppliers while simplifying the numerous processes (e.g., approval within the organization) of acquiring operating resources. That is, the enterprise application facilitates an easy to understand presentation of each process to the user, so complexity is minimized, while still allowing the enterprise to model sophisticated process scenarios.

FIG. 1 illustrates the connectivity of two ERPs with two enterprise applications. Here, enterprise application instance 110 interfaces with ERP 102 and enterprise application instance 120 interfaces with ERP 103. The ERP 102 includes ERP database 130 and ERP database 150. The ERP 103 includes ERP database 140 and ERP database 160.

An enterprise application, may model the world using a particular set of objects. Here, ERP object 170 uses the object model from ERP 102. ERP object 180 uses the object model from ERP 103. These ERP objects relate both to real-world objects, such as suppliers and catalog items, as well as to computery items such as folders used to display work in progress to users.

The enterprise application 110 and 120 communicates with their respective ERP in their terms. This means not only importing and exporting the particular kinds of data that a given ERP uses using the object model of the ERP, but also communicating using the idiosyncratic codes of each specific ERP application. Therefore, enterprise application 110 needs to respect the semantics of each and every ERP object model. For instance, SAP may work with a particular accounting model, meaning the enterprise application communicates with it using the business rules and user Ids that the SAP understands, such as, using the SAP's user, not the enterprise application user ID.

However, a problem occurs when wanting to acquire business data not contained in a single ERP application, but spread across several ERPs of different ERP types (e.g. one SAP ERP and one Oracle ERP). Typically this occurs when a business with an existing ERP mergers with or acquires another business which has its own ERP.

For example, two businesses may have merged, each with pre-existing ERP systems of different types. (e.g. ERP 102 may use a SAP system while ERP 103 may use a PeopleSoft system). Upon merging both businesses may decide to continue to operate both ERP systems separately because one business is based in the United States and the other in France. However, at times, a user may want to access both instances simultaneously. For example, for reporting purpose. When multiple ERP instances are represented in two distinct instances a user may not immediately view both instances simultaneously in an efficient manner. To view the ERP instances simultaneously the enterprise application would somehow union the instances together or transfer the data from both instances into a data warehouse. Both these methods are inefficient and place additional overhead to the enterprise application.

Another problem with having multiple ERP systems is that different resource data may be required to work with the differing ERP instances. For example, the ERP instance for the United States may contain different resource data attributes and business rules than the ERP instance for France. Most enterprise applications map the differences between the two ERPs at runtime to keep track of which resource data is valid for which systems. However, in many cases it is not possible to map all external semantics into a single representation. Mapping dissimilar representations will result in errors to the business process.

Another possible problem when accessing multiple ERPs is that the enterprise application will have to deal with data redundancy (e.g. the possibility that the same logical entity (for instance the same employee) is represented more than once, slightly differently and with potentially conflicting data, in different systems).

BRIEF SUMMARY OF THE INVENTION

A method and system for providing multi-organization resource management. According to one embodiment of the invention, data is imported from a set of one or more external applications, a purchase requisition is generated from resource data from the set of one or more external applications. Then, after the purchase requisition is approved and validated the purchase requisition is converted to a purchase order and exported to one or more external applications.

BRIEF DESCRIPTION OF THE DRAWINGS

The invention may best be understood by referring to the following description and accompanying drawings that are used to illustrate embodiments of the invention. In the drawings.

DETAILED DESCRIPTION OF THE INVENTION

A method and system of providing connectivity to multi-organization resource management systems simultaneously from varying external applications is described. In the following description, numerous specific details are set forth to provide a thorough understanding of the invention. However, it is understood that the invention may be practiced without these specific details. In other instances, well-known circuits, structures and techniques have not been shown in detail in order not to obscure the invention.

The techniques shown in the figures can be implemented using code and data stored and executed on the enterprise application. Such enterprise applications store and/or communicate (internally and with other network elements over the network) code and/or data using machine-readable media, such as magnetic disks; optical disks; random access memory; read only memory; flash memory devices; electrical, optical, acoustical or other form of propagated signals (e.g., carrier waves, infrared signals, lasers, digital signals, etc.); etc. Of course, one or more parts of the invention may be implemented using any combination of software, firmware, and/or hardware.

According to one aspect of the invention, variants and partitions are used in a multi-organization configuration to model data in external applications. In this way, data from two or more external applications may be accessed and viewed simultaneously without the need of mapping at runtime. In one embodiment, the multi-organization configuration provides simultaneous access to a single business that has several different internal organizations, each with different data or requirements.

Figure 1:
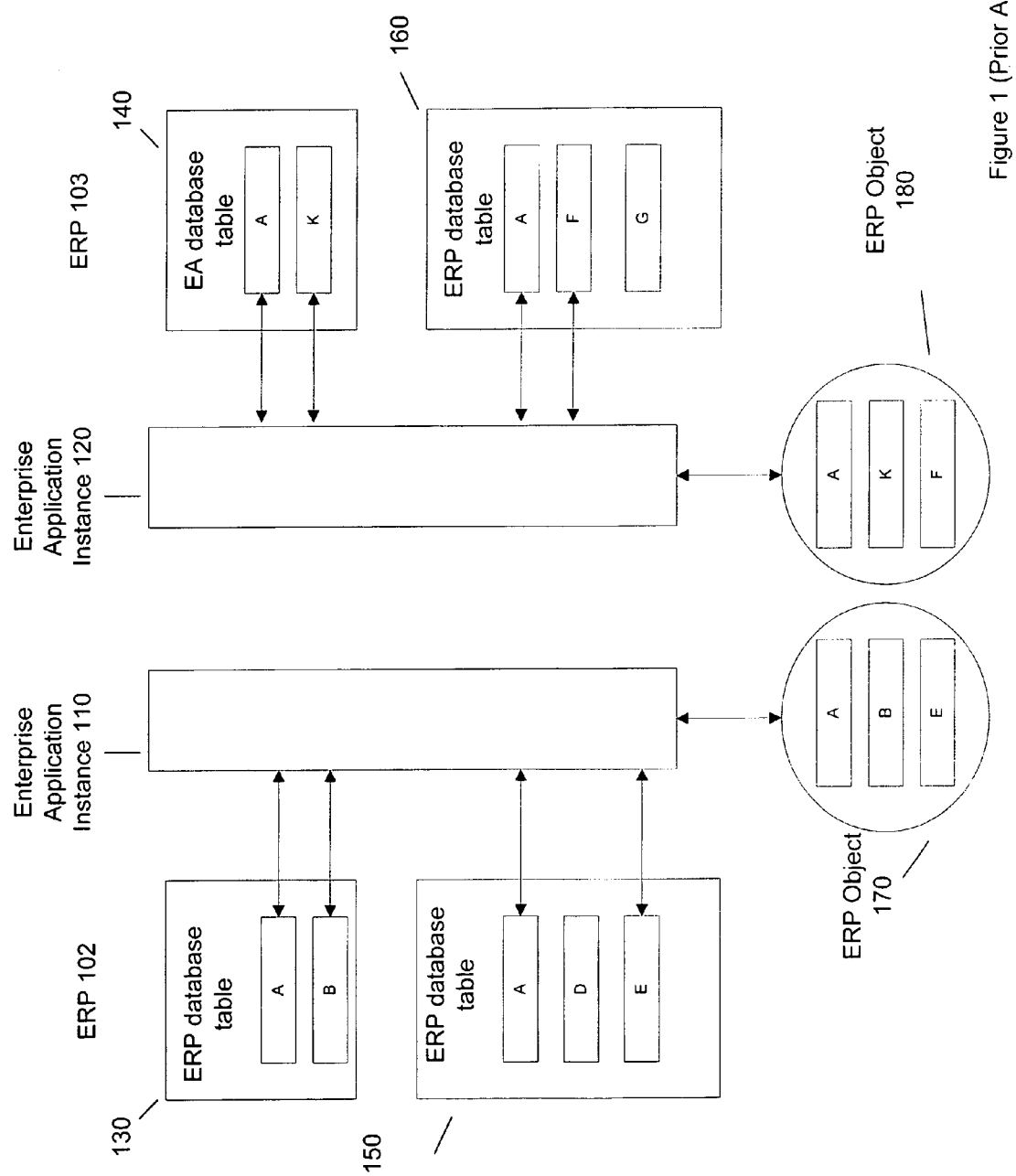
FIG. 1 illustrates the connectivity of two ERPs with two enterprise applications.
Figure 2:
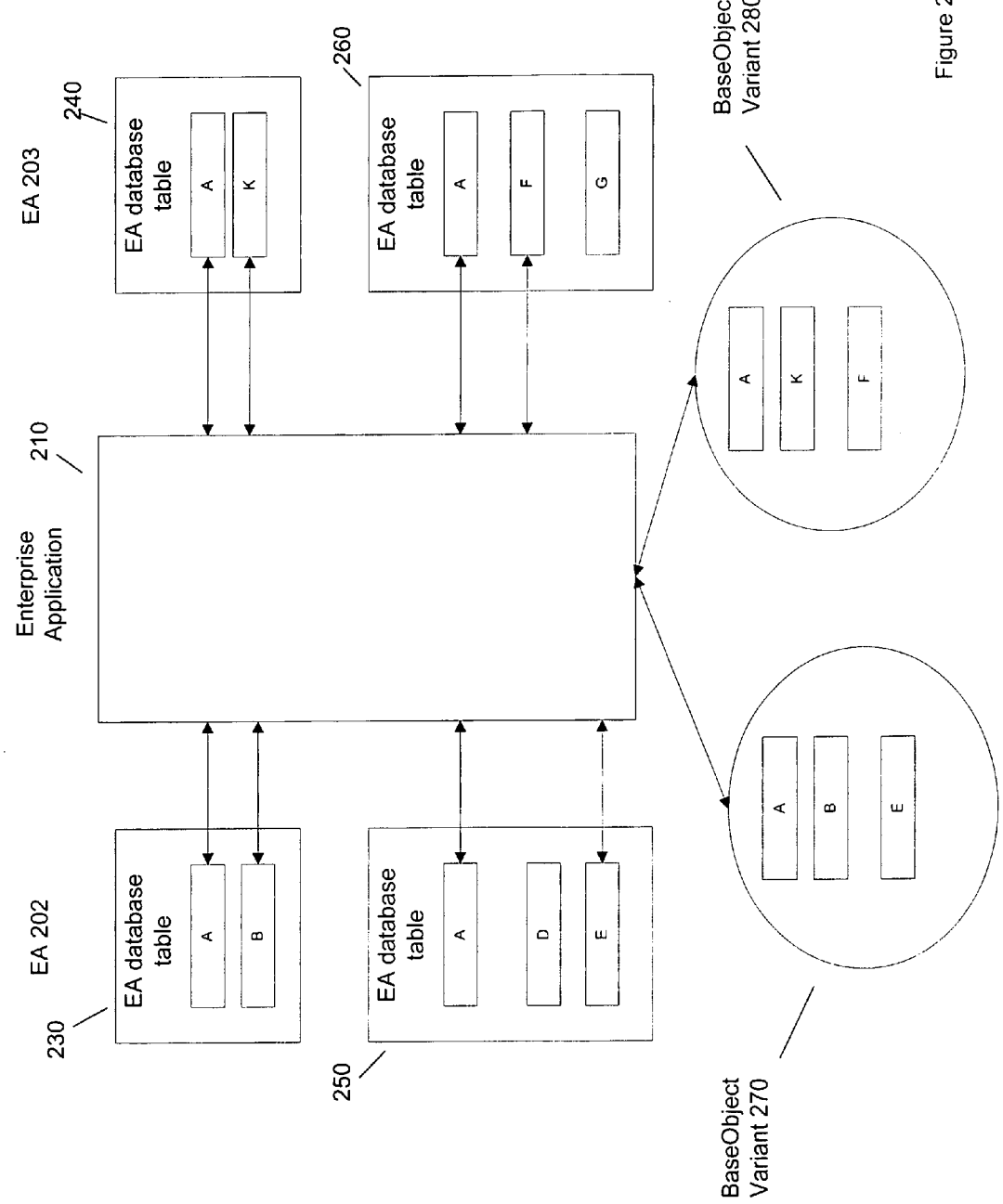
FIG. 2 illustrates a multi-organization configuration according an embodiment of the invention.

FIG. 2 illustrates a multi-organization configuration according an embodiment of the invention. Here, enterprise application 210 interfaces with two external applications, EA 202 and EA 203. The EA 202 includes EA database 230 and EA database 250 and the EA 203 includes EA database 240 and EA database 260. The enterprise application 210 models the EAs within BaseObject variant 270 and BaseObject variant 280. In one embodiment, both BaseObject variant 270 and BaseObject variant 280 contain the attributes and behavior that relate to every object type (e.g. users, requisitions, units of measure, etc.) for both systems as base data. However, in alternative embodiments multiple BaseObjects would exist for each object type.

BaseObject variant 270 and BaseObject variant 280 contain are extendable to allow for the addition of extrinsic attributes and behavior, as will be further described below. Extrinsics are attributes added to a variant. Here, variants represent the extrinsic attributes that is in one but not the other of both the external and enterprise applications. This is because, at times, various organizations within a business may independently add extrinsic attributes to their external application, depending on their unique business requirements.

For example, FIG. 2 may represent a configuration with two external applications used by two separate organizations within a single business. One in the United States (represented by EA 202) and one in France (represented by EA 203), which were developed by different groups, with different sets of requirements. Those two systems may have evolved over time to have slightly different notions of the resource data associated with a supplier, so that the two share some fields in common but diverge in others. For example, Table 1 illustrates an example of the shape for these two supplier data stores:

TABLE 1

| the Contact Name | Contact Name |
| Buyer | Freight Terms |
| Dispatch Method | Minority-owned business? |
| Minority-owned business? | |
| Ship-type ID | |

Variants define the data types (shape) and behavior of each individual external application. That is, variants are used to define differently shaped data of the same general type for the varying external applications. In one embodiment, methods that defines the behavior (e.g. business rules and ordering modules) are also encapsulated in a variant on a per-variant basis for the different external applications. Variants may also be used to defined required or validated fields.

Figure 3:
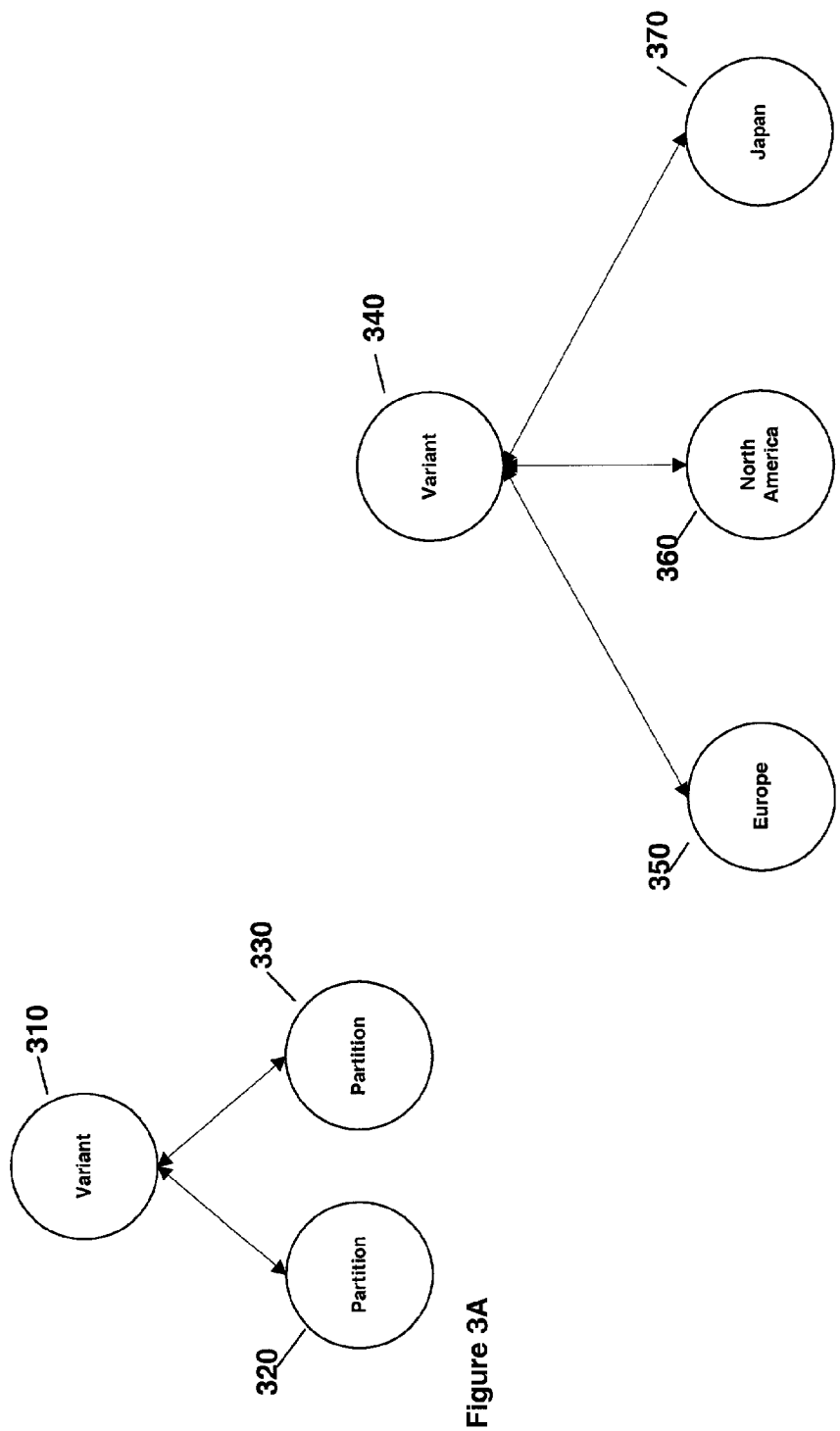
FIG. 3a illustrates an example of partitions in a multi-organization configuration according to an embodiment of the invention.
FIG. 3b illustrates an example of three partitions in a multi-organization configuration according to an embodiment of the invention.
Figure 4:
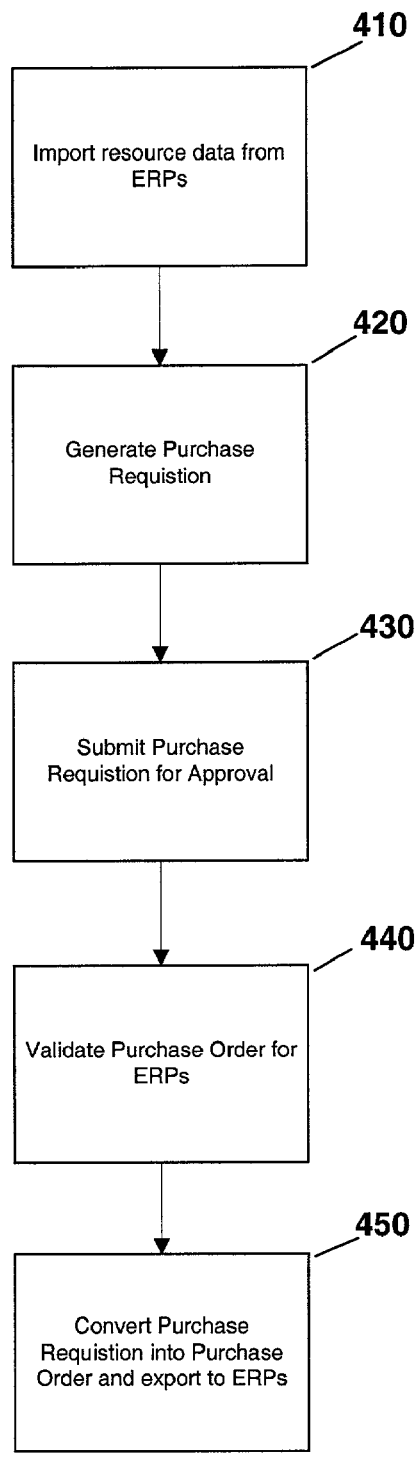
FIG. 4 is a block diagram illustrating the purchase requisition and orders validation process according to one embodiment of the invention.

Although, in one embodiment, variants define the shape of the data, variants do not supply the data. Here, partitions are used to describe the structuring of data (e.g. content). FIG. 3a illustrates examples of partitions in a multi-organization configuration according to an embodiment of the invention. Here, variant 310 is divided into partition 320 and partition 330. The partition 320 and partition 330 are used to segment identically shaped data of variant 310. Therefore, a partition is a collection of data content, which uses some particular variant to describe the shape of that data. In addition, one partition may be related to one but not multiple variants. For example, a data partitioned in variant 310 may not also be a partition of variant 340.

FIG. 3b illustrates an example of three partitions in a multi-organization configuration. For example, assume a business to have three external applications running: one in Europe 350, one in North America 360, and one in Japan 370. The external applications configurations are all identical meaning they have exactly the same data shape and behavior defined by variant 340. However, the data itself isn't identical. Therefore, North America 360 has all of the users for North America but doesn't have any data about the users in Europe 350 and Japan 370. In partitioning the data across all three applications, name space collisions is avoided with data such as, user names, suppliers IDs, etc. It should be understood that the invention is not limited to two or three partition. Alternative embodiments may have one or more partitions.

The following describes one embodiment of the invention where the external applications represent ERP systems (e.g. Oracle Financials, SAP 4.0B, SAP HR, PeopleSoft Financials, and PeopleSoft HR, etc). In this embodiment, the enterprise application integrates with existing ERPs, using existing resource data and behavior patterns. Here, the enterprise application is tied to existing ERP data sources, has business rules that define existing business practices, and provides custom data for a user interface.

In one embodiment, the enterprise application integrates with existing ERPs to facilitate purchase requisitions and orders. For example, assume a business has standardized on SAP for their ERP. Later, they acquired a new business which already uses Oracle for their ERP. The business decides to operate with the SAP and Oracle systems. Therefore, the enterprise application would then facilitate the purchase of a resource through both of the existing ERP systems, without changing the business rules or processes already in place.

To integrate the enterprise application with the ERP systems, the resource data on the ERP systems must be validated. At block 410, resource data is imported from one or more ERPs into the enterprise application, control then passes to block 420. The importation (and exportation) of resource data is performed with a collection of adapters. Adapters are further described in detail in International Application No. PCT/US98/08407 filed Apr. 27, 1998 and the contents of which are hereby incorporated herein by reference.

In one embodiment, the enterprise application executes adapters that import basic information (e.g. accounting fields, currencies, units of measure, etc.) into the enterprise application. Different adapters can potentially pull from different data sources. For example, the user adapter reads in a list of valid users (and perhaps also basic user profile information) from one or more data sources and stores it in the enterprise application. Generally, every user has a user profile, which includes roles, permissions, supervisor, default accounting information, and so on. In a typical configuration most of the user profile information is loaded in from a human resources application by the user adapter and is supplemented with additional resource data from within the enterprise application (e.g. the userid for the enterprise application).

At block 420, a user of the enterprise application with the appropriate permissions creates a purchase requisition, control then passes to block 430. In one embodiment, in addition to a unique username, each user is also given a login token. Here, the username and login token form a context from which the enterprise application determines which variant and/or partition the user may have access to. That is, the username authenticates each user and the login token differentiate users in a multi-organization configuration. For example, users who are allowed to work across multiple ERPs will get an extra login screen that asks them to choose which ERP they are working with now. In this way, the user may gain access to the data and behavior of multiple ERP systems simultaneously.

The user may now continue to create the purchase requisition by browsing through the enterprise application selections to define attributes, such as, accounting codes, units of measure, supplier names, etc. At block 430, the user submits the purchase requisition for approval, control then passes to block 440. The enterprise application checks the business rules to decide who has approve authority and sets up the approval flow accordingly.

At block 440, after the purchase requisition is approved, the enterprise application validates the resource data to be exported to one or more ERPs, control then passes to block 450. In this way, the purchase order requires resource data validation to ensure that the ERPs will accept the incoming resource data. In one embodiment, the enterprise application uses variants and partitions to determine whether a given purchase order is valid. Here, the variant describes the particular fields that need to exist and the partitions describe the particular values that are acceptable for those fields.

Therefore, when the enterprise application sends an order to ERPs, both the data shape and the data content must be acceptable to each ERP.

For example, if a particular ERP requires a three-line address, then every purchase order sent to that ERP must have a three-line address. This is validated per variant. Also, if a particular ERP recognizes only metric units of measure, then every purchase order going to that system must have metric units of measure. This is also validated by variant and the set of units of measure exist per partition. In one embodiment, each ERP system is represented by a separate partition. Therefore, from creation to when it is destroyed, the resource data in any given purchase requisition will remain in one partition.

At block 450, the enterprise application takes the approved and validated purchase requisition, converts it into a purchase order, and pushes that purchase order into one or more ERPs.

In one embodiment, variants are represented by instances of the variant class. Here, each variant is represented by a unique variant object. In one embodiment, a XML may be extended to incorporate the notion of variants into classes and groups, however, it should be understood that other web based programming languages may be used. By way of example, the following four new tags may be used: <classVariant>, <inClassVariant>, <groupClassVariant>, and <inGroupClassVariant>.

<classVariant> is a sub-tag of the <class> or <inClass> tag. It allows the specification of a new variant within the specified class. Class variants can hold new fields and/or new defaulters specific to the variant (defaulters represent methods or behavior encapsulated within the variant). Class variants are represented as separate, independent ClassMetaDT classes in the metadata that is further described below. In order to achieve this, the ClassMetaDT class include attributes such as a variant name, a list of related class variants (if the class is a non-variant class), and a backpointer to the owning non-variant (if the class is a variant).

<inClassVariant> is a sub-tag of the <inClass> tag. It allows for the modification of an existing class variant by adding or modifying fields and/or adding new defaulters. In order to achieve this, the metadata API class-based lookup methods take a variant argument (in addition to the class name).

In one embodiment, <groupClassVariant> and <inGroupClassVariant> are synonyms. They are subtags of the <groupClass> and <inGroupClass> tags. <groupClassVariant> and <inGroupClassVariant> allow for the specification of group information on a class variant. GroupClass variants are represented as separate, independent GroupClass classes in the metadata. In order to achieve this, the GroupClass class include a variant name and a list of related GroupClass variants (if the GroupClass is a non-variant).

In one embodiment, the <class> tag has a boolean attribute called "partitioned". The partitioned attribute determines if the specified class is partitioned. A class may be variantized (meaning changes specific to a single variant may be made) if it is marked as being partitioned.

The following illustrates a Top-Level declaration using XML syntax:

<variant name="SAP" type="ERP"/>
<variant name="EN" type="LANG"/>
<variant name="SAP:EN" type="ERP:LANG"/>

Here, the syntax covers all kinds of possible variations within a SAP ERP. For example, a business might have 3

SAP instances, all of which are so different that they require 3 different SAP variants (SAP1, SAP2, etc . . . type systems).

In one embodiment, the XML syntax for describing the variants may appear as followings:

```
<class . . .>
    <classVariant name="SAP">
        <field . . ./>
        <field . . ./>
    </classVariant>
    <classVariant name="JDE">
        <field . . ./>
        <field . . ./>
    </classVariant>
</class>
```

In this embodiment each variant field is declared independently. No field is shared, unless they are declared outside of the <classVariant> tag (which means that they are extrinsics common to all variants).

Alternatively, field declarations applied to different variants can be declared in a single file. In one embodiment, all variant fields are defined at once, then a class variant is define by referencing those fields:

```
<class . . .>
    <variants>
        <field name="f1" . . ./>
        <field name="f2" . . ./>
        <field name="f3" . . ./>
        <classVariant name="SAP">
            <fieldRef name="f1"/>
            <fieldRef name="f2"/>
        </classVariant>
        <classVariant name="SAP1">
            <fieldRef name="f1"/>
        </classVariant>
        <classVariant name="JDE">
            <fieldRef name="f3"/>
        </classVariant>
    </variants>
</class>
```

In another embodiment, variant field groups are defined, then a class variant is defined by referencing one or more field groups:

```
<class . . .>
    <variantFieldGroup name="Group1">
        <field name="f1" . . ./>
        <field name="f2" . . ./>
    </variantFieldGroup>
    <variantFieldGroup name="Group2">
        <field name="f3" . . ./>
    </variantFieldGroup>
    <classVariant name="SAP">
        <fieldGroup name="Group1"/>
    </classVariant>
    <classVariant name="SAP1">
        <fieldGroup name="Group1"/>
        <fieldGroup name="Group2"/>
    </classVariant>
    <classVariant name="JDE">
        <fieldGroup name="Group2"/>
    </classVariant>
    </variants>
</class>
```

In one embodiment, an inheritance model is used. Here, variants are modeled as classes. The variant declare what "real" class they are a variant of and an optional variant to inherit from (for sharing purposes):

```
<class name="User">
</class>
<variantClass variantName="SAPGeneric"
        variantOf = "User"
        abstract="true">
    <field name="f1" . . ./>
    <field name="f2" . . ./>
</variantClass>
<variantClass variantName="SAP"
        variantOf="User"
        variantSuper="SAPGeneric">
    <field name="f3" . . ./>
</variantClass>
```

As shown, in one embodiment, variants may be inherited. That is, if a superclass defines a variant, all of its subclasses automatically also get that variant. Therefore, a method (for instance called fixupVariants( ) on ClassMetaDT ) may handle the creation of any variants in a class resulting from variants on its superclass(es).

In one embodiment, variants use a two-dimensional inheritance. Here, a variant of a class has additional or modified attributes, and additional or modified behavior, but on an entirely separate tree of classes. For example, assume classes A, B, & C are defined by the enterprise application. Here, B inherits from A and C inherits from B. If "Admin" and "Operations" are defined as variants of these classes. Then, if attributes name and phone are added to class A in the Admin variants, then variant Admin of class A has attributes name and phone, while variant Operations of class A does not. In addition, variant Admin of class B inherits attributes name and phone while variant Operations of class B does not.

In one embodiment, variant classes automatically inherit all of the attributes, defaulters, etc . . . from their non-variant base class. This is done initially by calling a non-variant's variantClone( ) method, which generates a clone of the class specifically designed to hold a variant of the class. All metadata classes which can have variant-specific versions also have variantClone( ) methods for the same purpose.

At runtime, according to one embodiment, each variant is represented by a unique variant object. Each separate list of unique objects may be maintained on the server and on each client. This means that== is a legitimate test for variant objects. Therefore, if field properties are fetched for a class, the field properties may be fetched on the basis of a partition, even though the properties only vary by variant.

As described above, in general, shape and behavior varies by variant, and data varies by partition. However, in one embodiment, some data varies by variant. Here, the data that does so is metadata, which relates directly to the classes. An example is report and ruleset metadata. In one embodiment, the report metadata is loaded via adapters and into report metadata objects within the server. Because this data spans partitions, the report metadata class is unpartitioned. Therefore, the objects are global, with respect to the normal partitioning scheme. To separate the objects by variant, in one embodiment, a special column is included to the report metadata objects that describes the variant for the object. Therefore, when an object for a particular variant is required, a constraint is added to the query to choose the correct variant. Rulesets are structured in the same manner.

According to one embodiment, both the variants and partitions may exist both in memory, as Java classes with extrinsic extensions and also exist in a persistent form as rows and columns in database tables. In one embodiment, class metadata lookups are cached based on classname and variantname. Instead of one big cache with a hybrid "class-Name:variantName" key, separate caches are used, one for each variant. Each variant-specific cache has the classes for that variant cached away in it. In this way, cache contention is reduced and the need to generate the "className:variantName" hybrid keys (which cause a lot of memory allocations) is eliminated.

In one embodiment, every multi-organization configuration starts out with one standard variant, which is called Plain. Every configuration has at least one other variant, in addition to Plain. Here, Plain is used as a template for other variants. In this embodiment, the data in a configuration goes in one of three places: (1) In a pool of common data, shared across all partitions. The data in None is common data, shared among all partitions. None isn't is where unpartitioned data is stored. (2) In a particular named partition. Here, when setting up a configuration the number of partitions to set from a particular variant may be determined and named. Much of the data will go into those named partitions. In one embodiment, when a named partition is created it is defined with an pre-existing variant.

(3). In a special partition called SupplierDirect. The SupplierDirect partition provides a place for resource data being loaded directly from suppliers data store on a particular ERP. This configuration is used to ensure that the supplier data is kept separate.

In one embodiment, partitions are represented with instances of partition classes. There is a single partition instance per partition, so that it is legal to compare partition instances with==. This identity is carefully maintained across the client/server RPC boundary by using the partition's name, which is unique. The partition class allows callers to determine the partition's name, variant, etc.

In one embodiment, the partition is represented by an integer, the "partition number", within a BaseObject. BaseObjects and ClusterRoots are "base" abstract datatypes of the enterprise application. In this embodiment, any persistent object defined within the enterprise application is either a BaseObject or a ClusterRoot. Here, at configuration time, the enterprise application may create Java implementations for the objects and configure a data store to hold the objects. Then at run time, the enterprise application takes care of saving objects to the database and restoring objects from the database.

In one embodiment, any object that is saved into an enterprise application database must be derived from BaseObject. It is from the BaseObjects that additional fields are extended, (e.g. extrinsics). Extrinsics are defined in metadata.

In one embodiment, related BaseObjects may be related into self-contained sets called clusters. A number of operations are performed on clusters. For example, only clusters can be saved and restored from the database, and clusters are passed between the client and server. A cluster can reference another cluster by its unique name but won't actually point to it. For instance, a given user might have supervisor field, also of type user. But the supervisor is not contained within the user; it is a distinct cluster. The generated code makes it appear that the supervisor object is stored in the User, but actually all that is stored is the BaseId that identifies the Supervisor.

By contrast, BaseObjects can, and often do, point directly to other BaseObjects. For example, a catalog entry might have a price of type Money. The catalog entry actually contains the Money object. The component objects of a given cluster may be determined by referencing the metadata. A cluster may be extended at configuration time through metadata changes.

In one embodiment, a cluster is comprised of a root object of class ClusterRoot, plus all of the objects the cluster contains. In one embodiment, the containing cluster is retrieved via its ClusterRoot, from which the BaseObject may be navigated to.

Every BaseObject has a unique key associated with it, called a BaseId. No two objects have the same BaseId. BaseIds are useful for looking up and manipulating specific objects. One of the basic operations of the BaseObject is to return a ClusterRoot given a BaseId. Each cluster has a distinguished BaseObject called the root. A cluster is identified by the BaseId of the root. The root BaseObject must derive from the class' ClusterRoot. Therefore, BaseIds are used for indirect references to objects.

In one embodiment, at the object-relational database level, variantized ClusterRoot classes data stored in a separate table from the corresponding non-variant ClusterRoot. Normalization applies to variants similarly to how they apply to superclasses and subclasses. If a class (or one of its superclasses) is marked as being normalized, then its variants will also be normalized so that its non-variant attributes will be stored in the non-variant table. In this case, only variant-specific attributes are stored in the variant table.

As stated above, in one embodiment, the partition is represented by an integer called "partition number" within the BaseObject. In this manner, queries involving partitions would not require an extra join parameter. The partition number is what is stored in the database table, and which is used in database queries.

When the enterprise application generates queries, the queries automatically add on a WHERE constraint with these specified partition values. There are two special constants for partition vectors. The first is called Partition.NoneVector and is used for querying unpartitioned classes. The second is called Partition.AnyVector and is used to query all instances across all partitions for the given class. In one embodiment, the vector is used to accommodate the supplierdirect partition. Thereby, allowing access to catalog items for a ERP partition plus a supplierdirect partition for catalog-related queries.

In one embodiment a ColumnMappings class (the class that builds column mappings and ultimately generates the SQL Select statement) includes an array of partitions and the notion of current partition similarly to how it always had the notion of current class. The current partition is used to propagate the partition information to things like join clauses.

The ColumnMappings class uses the partition information to determine which class meta(s) to bind to. If the partition is defined as Partition.Any, then the ColumnMappings explores the set of classes to include all variants of the specified base class.

In one embodiment, the query layer will add on a WHERE PartitionNumber=0 clause for a PartitionNone query even for non-partitioned classes. The reason is because in this embodiment, a given table can hold instances of both partitioned and unpartitioned classes. For example, one could have class A be unpartitioned and normalized and class B (which inherits from class A) be partitioned. Then, class A's table would contain instances of both unpartitioned A's and partitioned B's. If a Partition.None is specified as the partition of interest for the query, therefore the (PartitionNumber=0) clause is added to grab the unpartitioned instances. In one embodiment, this check is eliminated for a non-partitioned, non-normalized class.

In one embodiment, the query layer will always generate a WHERE clause of the form (WHERE PartitionNumber=0 or PartitionNumber=<partition number>) for a non-PartitionNone query even for partitioned classes. The reason for the seemingly extra "PartitionNumber=0" clause is for the case where the "classNameIsLeaf" parameter is false. In this case, all subclass instances of this class are returned as well. But, some of these subclasses may be unpartitioned. Therefore, the partition-specific check will end up excluding these classes, where they are to included (under the assumption that a partition-specific query always wants to return unpartitioned instances in addition to partition-specific instances), hence, the need for the extra "WHERE PartitionNumber=0) check. In one embodiment, the "PartitionNumber=0" check is omitted for the case where classNameIsLeaf is true.

In one embodiment, if classNameIsLeaf is true and the class is normalized and the class has one or more subclasses, then the query layer adds on an extra WHERE clause of the form: (WHERE rootId LIKE '%.2f'). This is so that only instances of the particular class are returned because the table holds instances both of the class and its subclasses. In this way, the potential to return get subclass instances is eliminated, when classNameIsLeaf is true.

As stated above, one partition may not be related to multiple variants. Various checks may be required to ensure that objects do not cross partitions. In one embodiment, each object is marked with its partition. This may require every constructor and every init method associated to the partition to have a partition argument added to it. For instance, when BaseObjects are added to ClusterRoots, their partitions need to match.

In one embodiment, instances of unpartitioned classes do not exist within a partition. They are also visible across partitions. Looking in the database, their partition number column is marked with a zero. Zero is assumed to be the value for Partition.None in the code.

In one embodiment, because a partition is in a single variant, most of the Java code that comprises the enterprise application does not manipulate variants, only partitions. Therefore, once a partition instance is determined, the variant may also be determined.

Although the described embodiments discloses the enterprise application as being developed in an object oriented Java programming environment, it should be understood that, alternatively, the enterprise application may be developed with other programming languages and is not limited to Java.

It should also be understood that the enterprise application is not limited to communicating with ERP systems, and alternatively may communicate with a wider range of applications, data sources, and sinks.

While the invention has been described in terms of several embodiments, those skilled in the art will recognize that the invention is not limited to the embodiments described. The method and apparatus of the invention can be practiced with modification and alteration within the spirit and scope of the appended claims. The description is thus to be regarded as illustrative instead of limiting on the invention.

What is claimed is:

1. A method for constructing an enterprise application comprising:
    constructing a first variant, wherein the first variant comprises a collection of a plurality of BaseObjects, wherein a BaseObject is a persistent enterprise application object, a running state of the enterprise application object, and metadata describing shape of the enterprise application object; and
    constructing a second variant, wherein the second variant comprises a collection of BaseObjects representing the differences from the first variant required to integrate the enterprise application with a first external application.

2. The method of claim 1 where said first and second variants inherit attributes and behavior from said BaseObjects.

3. The method of claim 1 where said second variant includes one or more partitions, a partition to provide content to said shape of said second variant, said content to include data from the first external application.

4. The method of claim 3, where said partition is related to only one variant.

5. The method of claim 1 further comprising:
    constructing a context, said context includes a user specific information, said context used to determine which variant said user may access.

6. The method of claim 5 where said user specific information includes a username and a login token.

7. The method of claim 1 wherein said first and second variants may be accessed simultaneously.

8. The method of claim 1 wherein said first external application is a ERP.

9. The method of claim 1 wherein said first external application includes a SAP ERP, a PeopleSoft ERP, and an Oracle ERP.

10. The method of claim 1 wherein said first and second variants are defined using XML.

11. The method of claim 1 wherein said first and second variants use two-dimensional inheritance.

12. The method of claim 1 further comprising:
    a cluster, said cluster includes a set of one or more BaseObjects.

13. The method of claim 1 wherein said enterprise application is a multi-organization resource management system.

14. The method of claim 3, wherein the partitions store data from the external application.

15. The method of claim 1, further comprising:
    constructing a third variant, wherein the third variant is a collection of BaseObjects representing the differences from the first variant required to integrate the enterprise application with a second external application.

16. The method of claim 15, wherein the second and third variants are used simultaneously to access data associated with the first external application and data associated with the second external application.

* * * * *